United States Patent
Seol et al.

(10) Patent No.: US 6,892,220 B2
(45) Date of Patent: May 10, 2005

(54) APPARATUS AND METHOD FOR CREATING A LINK AND CHECKING LINK VALIDITY FOR OBJECTS BY STORING A TIMESTAMP IN A VALIDITY CHECK FIELD FOR LINKING TO A MULTIMEDIA DOCUMENT

(75) Inventors: Sang Hoon Seol, Seoul (KR); Sang Wook Oh, Seoul (KR); Chul Hee Kang, Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 675 days.

(21) Appl. No.: 09/729,559

(22) Filed: Dec. 4, 2000

(65) Prior Publication Data

US 2001/0025284 A1 Sep. 27, 2001

(30) Foreign Application Priority Data

Dec. 3, 1999 (KR) ........................................ 1999-54869

(51) Int. Cl.⁷ .............................................. G06F 15/16
(52) U.S. Cl. ........................ 709/203; 709/217; 709/219
(58) Field of Search ................................ 709/200, 203, 709/217, 219

(56) References Cited

U.S. PATENT DOCUMENTS

| 5,860,071 A | * | 1/1999 | Ball et al. .................... 707/100 |
| 5,918,012 A | | 6/1999 | Astiz et al. |
| 6,256,028 B1 | * | 7/2001 | Sanford et al. ............. 345/841 |

\* cited by examiner

*Primary Examiner*—Nabil El-Hady
(74) *Attorney, Agent, or Firm*—Merchant & Gould P.C.

(57) ABSTRACT

An apparatus and method for checking a link validity in a computer network, wherein, for the linking and referencing from one multimedia document to a different multimedia document in the computer network, desired information of the different multimedia document, such as last modified timestamp information indicative of a last modification time of the different multimedia document and latest version information of the different multimedia document, are stored in a validity check field, thereby assuring a link consistency. Therefore, the number of system errors can be cost-effectively reduced when referencing a multimedia document, and the reliability of searching and browsing can be increased.

5 Claims, 7 Drawing Sheets

FIG. 1

```
<HTML>
<HEAD>
        <TITLE> The 1990 's economic growth rate </TITLE>
</HEAD>
<BODY BGCOLOR=white TEXT=black
 Comparison-analyzing the korean economic growth rate by year during the 1990's ..
 Omission
    ..

<BR>
 The 1990 's Korean GDP and economic growth rate by year
    (95 series) can be expressed in graph as follow. <BR>
 <img src= "http://business.korea.ac.kr/image/TRgdpgrly-95.gif"><BR>
    ..
 Omission
 </BODY>
 </HTML>
```

```
Bool check ValidURE (string referenceURI, string ReferenceValidData )
{
    if ( isExistURI = True )
            if ( GetReferenceValidData(ReferenceURI) = referenceValidData
                    return TRUE;
    return FALSE;

}
```

APPARATUS AND METHOD FOR CREATING A LINK AND CHECKING LINK VALIDITY FOR OBJECTS BY STORING A TIMESTAMP IN A VALIDITY CHECK FIELD FOR LINKING TO A MULTIMEDIA DOCUMENT

BACKGROUND OF THE INVENTION

1. Field of the Invention

The present invention relates in general to an apparatus and method for checking a link validity in a computer system, and more particularly to an apparatus and method for checking a link validity in a computer network, wherein, for the linking and referencing from one multimedia document to a different multimedia document in the computer network, desired information of the different multimedia document, such as last modified timestamp information indicative of a last modification time of the different multimedia document and latest version information of the different multimedia document, are stored in a validity check field, thereby assuring a link consistency.

2. Description of the Prior Art

At the present, a large amount of information is exchanged over a computer network such as the Internet in such a manner that computers connected to the computer network exchange information with other computers connected thereto. A technique for linking separated associated information together is generally used for effective utilization of multimedia documents in the computer network. It can be seen that links or hyperlinks currently used in computer networks have only information related to addresses of referenced multimedia documents. In this technique, a link is created whereupon an address thereof is used to search for a referenced multimedia document. As a result, the system first searches for a multimedia document via an associated link and then references its contents.

Figure 1:
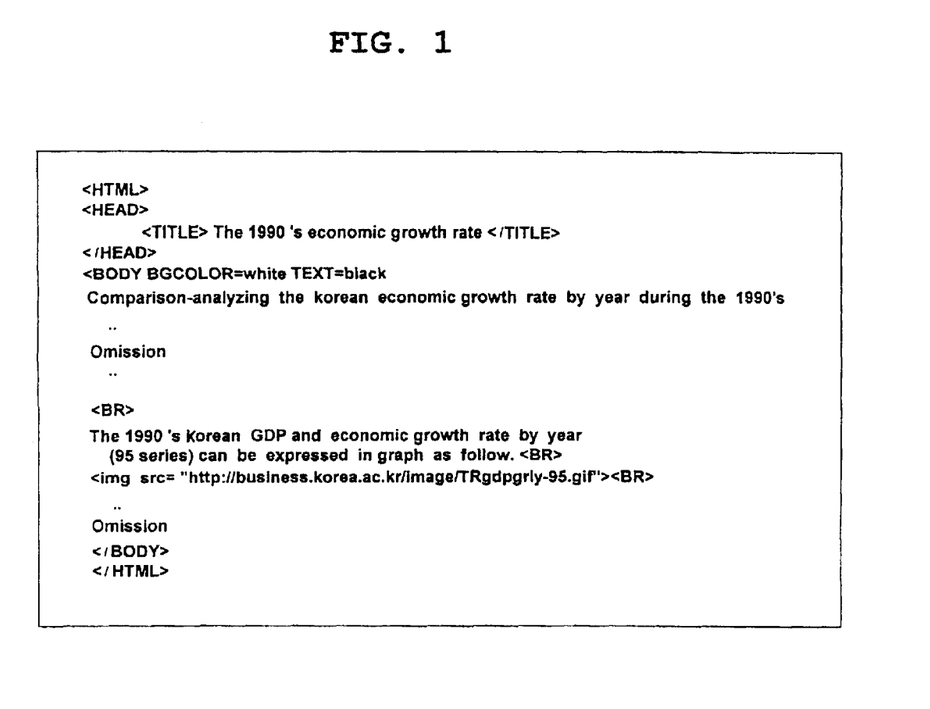
FIG. 1 is a view showing an example of an HTML document containing a link.
Figure 2:
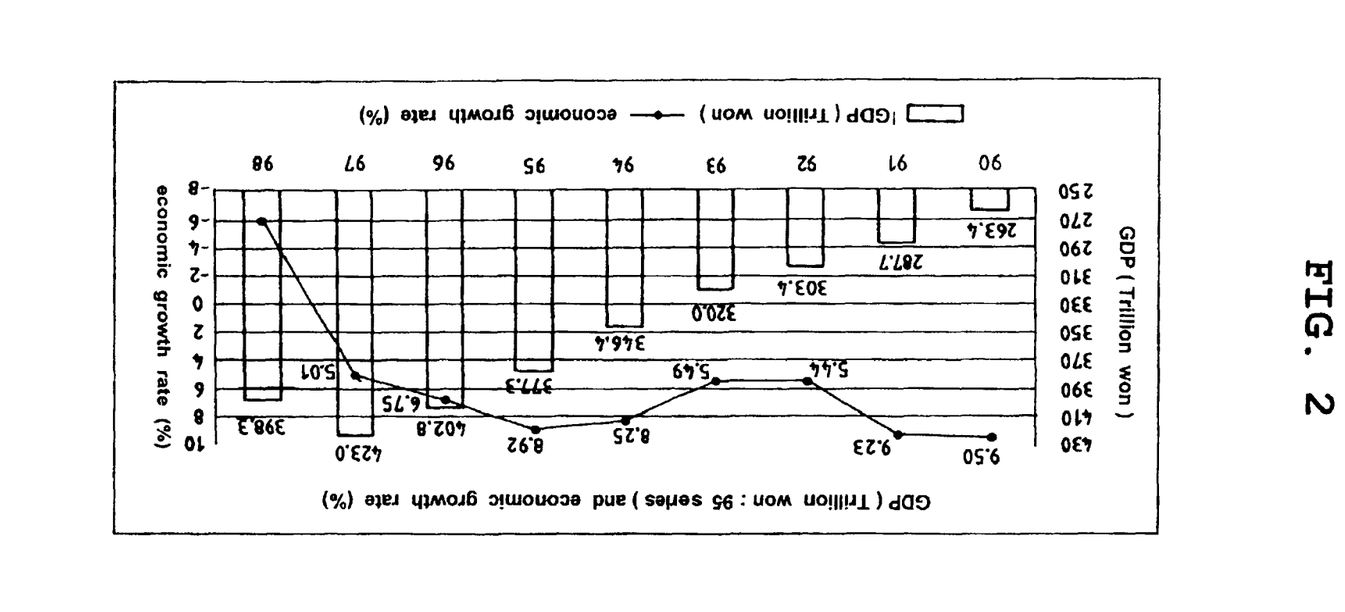
FIG. 2 is a view showing an example of a multimedia document referenced by a link.

Referring to FIG. 1, there is shown an example of an Internet document (hypertext markup language (HTML) document) explaining the current economic situation of Korea. In this drawing, a link is used to specify a part describing the Korean economic growth rate by year during the 1990's with the aid of a bar graph for the better understanding of users reading the document. This link is indicated at the middle portion of FIG. 1 by "<imgsrc= "http://business.korea.ac.kr/image/TRgdpgrlv-95. gif">", wherein "TRgdpgrlv-95.gif" is a name of a referenced bar graph of FIG. 2 and "http://business.korea.ac.kr/image/TRgdpgrlv-95.gif" is an Internet address of the referenced bar graph.

Due to the development of computer systems and the Internet, a multimedia document editor and creation tools are universally used now, resulting in multimedia documents being frequently created, modified and deleted. For this reason, it is increasingly necessary to use a linked multimedia document after judging whether it is the very same one when an associated link was created.

Figure 3:
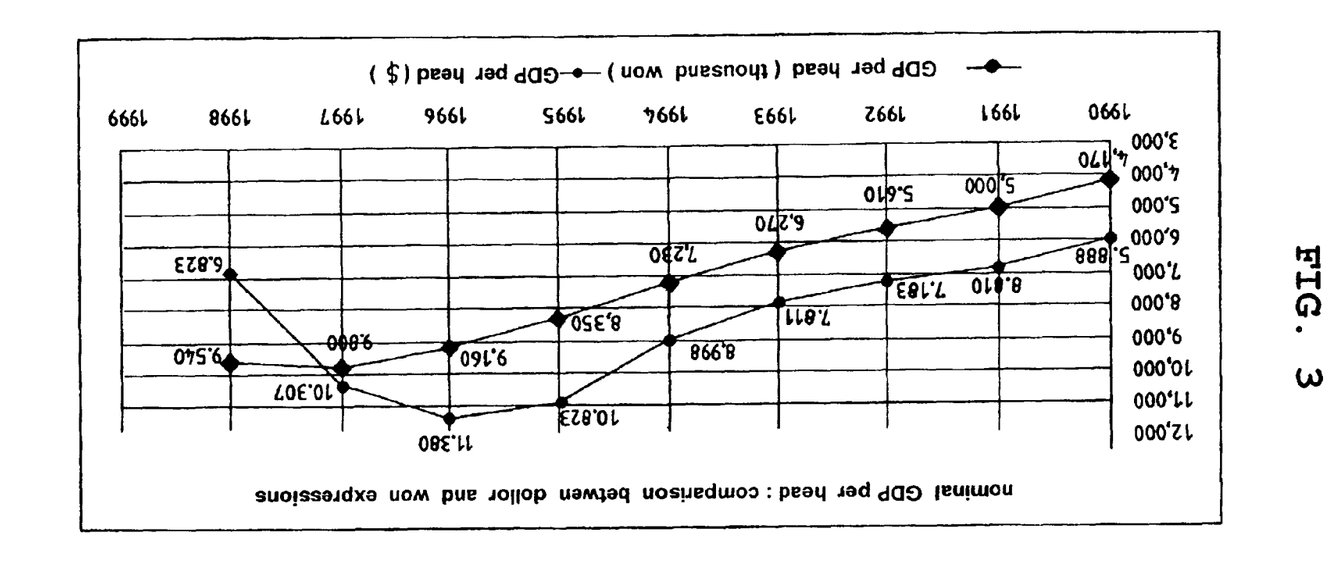
FIG. 3 is a view showing an example of a referenced multimedia document containing contents modified or changed after link creation.

Looking at the above example, a picture file indicated by "TRgdpgrlv-95.gif" exists, but its contents may be altered, an example of which is shown in FIG. 3. This example indicates the comparison between dollar and won expressions of Korean nominal GDP per head (95 series) in the 1990's. Hence, there is no further validity in the link "http://business.korea.ac.kr/image/TRgdpgrlv-95.gif" used in the Internet document of FIG. 1 to indicate the Korean GDP and economic growth rate by year (95 series) in the 1990's. In this case, if the link is used as it is, the document of FIG. 1 shows a picture file mismatched with the original contents.

The above-stated examples straightforwardly point out that there is a need for a procedure for checking the validity of a link before using the link. In particular, with the rapid development of an Internet network, the use of a method for linking multimedia documents to one another when they are created is on a rapidly increasing trend. In this regard, a conventional linking method for storing only addresses may erroneously transfer the contents of multimedia documents. The conventional linking method may further degrade the system performance and cause unexpected errors.

In the current computer system, a variety of information are together stored as metadata as a basic information unit. For example, information such as a date of creation, a date of modification and properties indicative of read only, hide, write and compress are together stored in each file.

However, in the computer network, each object, which is a fundamental unit for information processing, may be smaller in size than each file, and several individual objects may be present in each file. As a result, for metadata stored on a file basis, metadata regarding respective objects may not be actually stored and information regarding respective objects may not be applied in using the objects. As another example, metadata about objects must exist for object creation and modification in a distributed database.

SUMMARY OF THE INVENTION

Therefore, the present invention has been made in view of the above problems, and it is the objective of the present invention to provide an apparatus and method for checking a link validity in a computer network, wherein latest version information and last modified timestamp information of each document are stored in a validity check field, thereby assuring a link consistency.

It is another objective of the present invention to provide an apparatus and method for checking a link validity in a computer network, which can reduce a system error amount with effective cost and enhance the reliability of searching and browsing.

In accordance with one aspect of the present invention, the above and other objectives can be accomplished by a provision of a method for checking a link validity in a computer network, configured to store version information and timestamp information of each object in a validity check field upon creating a link and to determine from the stored version information and timestamp information whether the contents of a multimedia document have been changed upon referencing the multimedia document.

In accordance with another aspect of the present invention, there is provided an apparatus for checking a link validity in a computer network, comprising information storage means of a computer system having a validity check field for storing version information and timestamp information of an object upon creating and modifying the object.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

In the present invention, a multimedia document signifies a document that contains data or information in various formats such as character, audio, moving image, etc. and is exchanged over a computer network. This multimedia document may include a text document composed of only characters.

Figure 4:
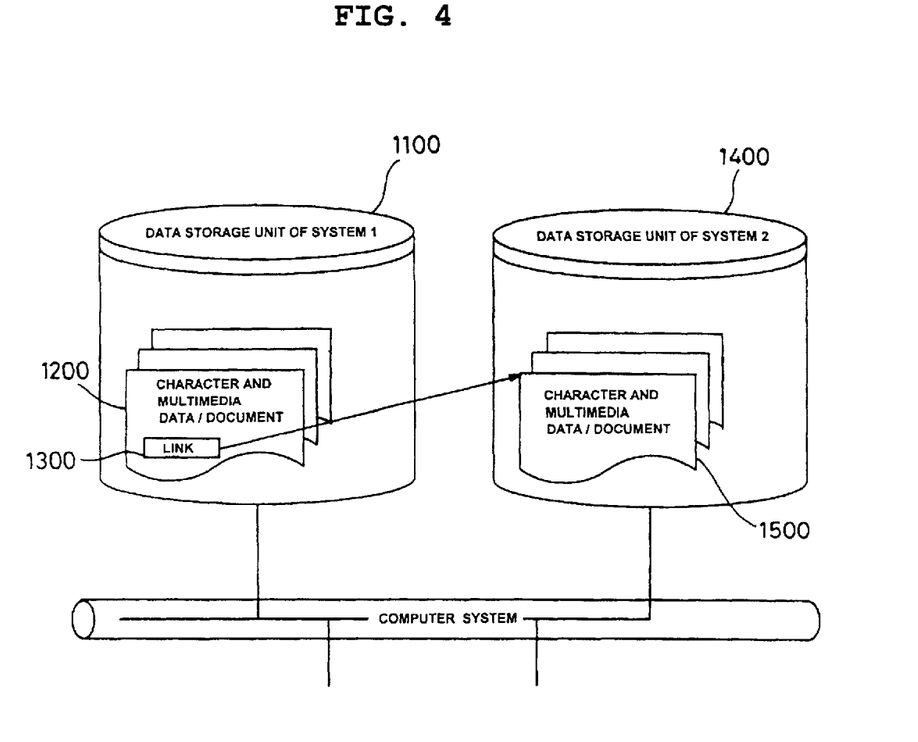
FIG. 4 is a conceptual diagram illustrating a method of referencing from one multimedia document to a different multimedia document via a link in a computer system.
Figure 5:
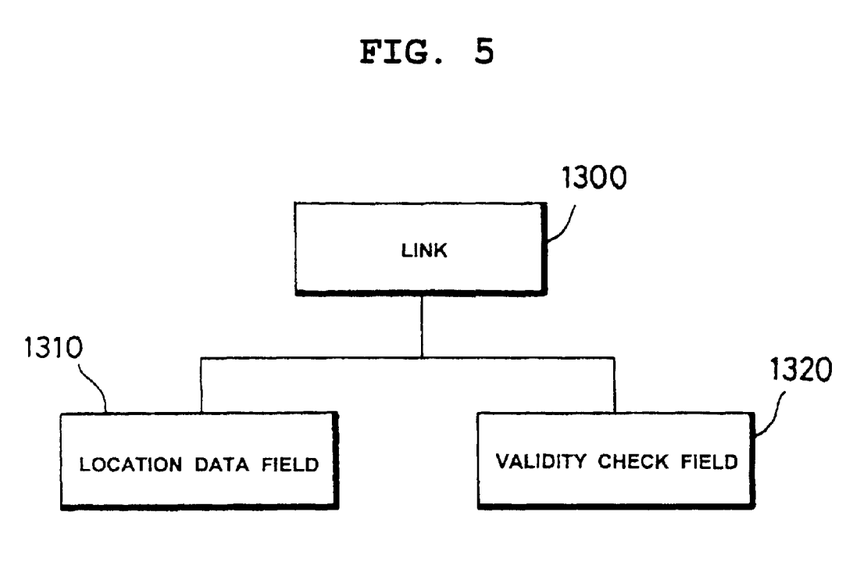
FIG. 5 is a conceptual diagram illustrating a link configuration provided with a validity check field capable of checking a link validity and a location data field in accordance with the present invention.

As shown in FIGS. 4 and 5, the present invention proposes a validity check field 1320 capable of checking the validity of a link to a multimedia document.

Figure 6:
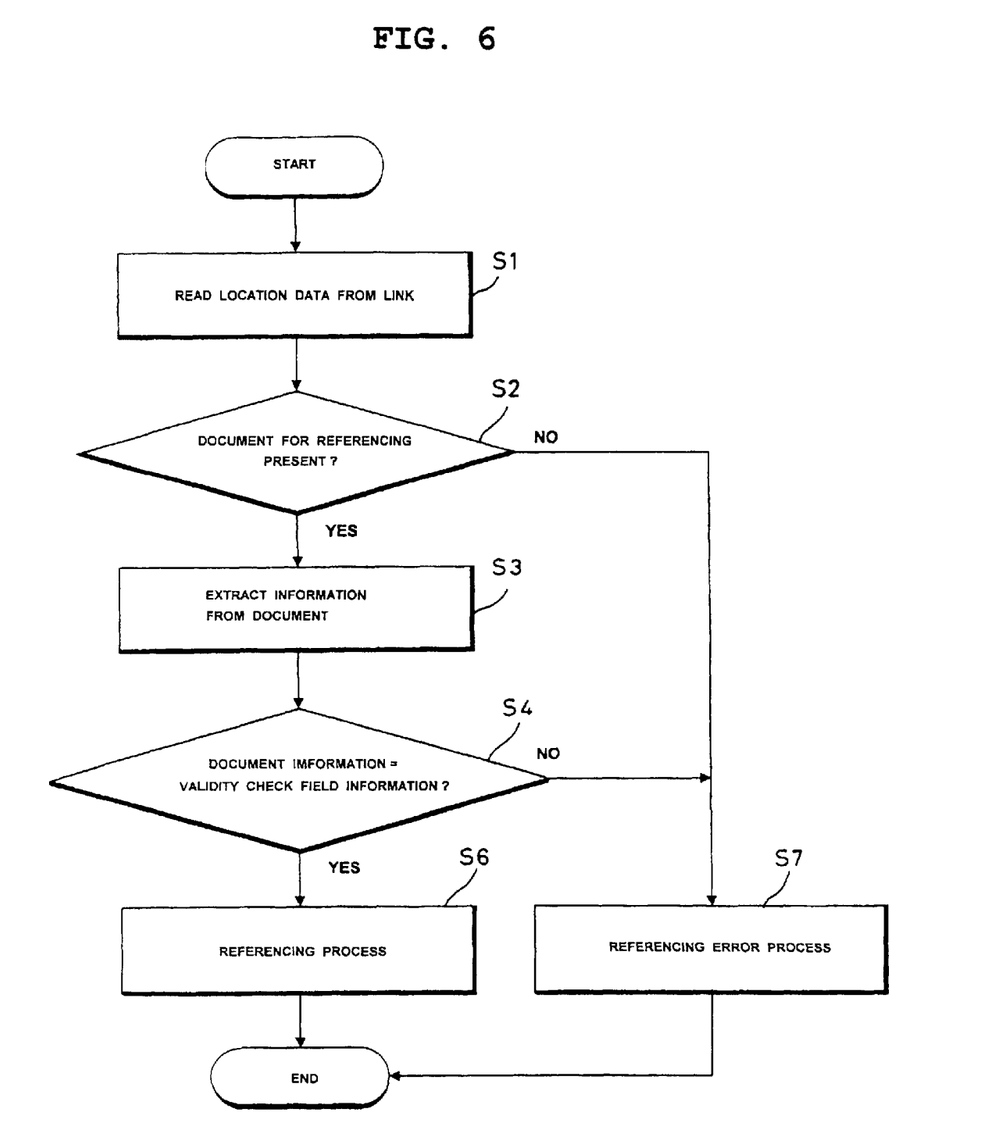
FIG. 6 is a flowchart illustrating a link validity checking method in accordance with the present invention.

According to the present invention, as shown in FIG. 6, the validity check field 1320 is used together with a location information field 1310 when a link 1300 is created on the basis of referencing to a multimedia document 1500. For referencing to data via the link 1300, there is further proposed a method for determining whether the contents of the data are the same as those at the time of link creation.

For example, an Internet address (i.e., uniform resource locator (URL)) of a link in the current computer system may be composed of a server name, directory location and multimedia data or document file name. An detailed example of such an Internet address may be "http://mpeg.korea.ac.kr/multimedia/hello.mpg", wherein "http://" is an International standard symbol declaring the start of the Internet address and "mpeg.korea.ac.kr" is an address of an Internet server. Also, "/multimedia/hello.mpg" represents a directory configuration of multimedia data and a file name of a multimedia document. The Internet address configured in this manner is a unique address indicative of a multimedia document. In other words, there are possibly present a large number of multimedia documents named "hello.mpg" on the Internet, but a "hello.mpg" document indicated by "http://mpeg.korea.ac.kr/multimedia/hello.mpg" is unique. This unique Internet address is used to indicate the location of a multimedia document when an associated link is created.

In the present invention, the validity check field 1320 shown in FIG. 5 is provided together with the location data field 1310 in order to check the validity of the link 1300 upon linking from a multimedia document 1200 shown in FIG. 4 to the referenced multimedia document 1500.

FIG. 5 is a conceptual diagram illustrating the configuration of the link 1300 having the validity check field 1320 inserted therein. As shown in this drawing, the link 1300 is composed of the location data field 1310 and validity check field 1320. The location data field 1310 is adapted to store a computer system address containing an Internet address, an object index number or object class number and an object locator. The validity check field 1320 is additionally provided to store data capable of checking whether the above computer system address is kept valid. In detail, last modified timestamp information and version information are stored in the validity check field 1320.

Now, a method for checking the validity of the link 1300 as stated above will be described in detail with reference to FIG. 6.

First, the system reads location information stored in the location data field 1310 of the previously created link 1300 (S1). Then, the system moves to a location indicated by the read location information and determines whether a multimedia document for referencing is present at the moved location (S2). If there is no multimedia document for referencing at the moved location, the system performs a referencing error process (S6). Alternatively, if a multimedia document for referencing is present at the moved location, the system extracts predetermined information from the multimedia document (S3) and determines whether the extracted information is the same as that stored in the validity check field 1320 (S4). In the case where the extracted information is the same as that stored in the validity check field 1320, the system performs a referencing process (S5). Namely, this case signifies that the contents of a multimedia document indicated by a link are the same as those at the time of link creation. On the other hand, upon determining at the above step S4 that the information of the multimedia document for referencing is not the same as that stored in the validity check field 1320, the system recognizes that the contents of the multimedia document for referencing were changed after link creation. Provided that the linked multimedia document 1500 is referenced even though its contents were changed, referencing errors will occur in the contents. In this case, the system must proceed to the above step S6 of performing the referencing error process to limit or inhibit the use of the link. As apparent from the above description, the link validity checking method of the present invention is very simple in configuration and very cost-effective.

At the above step S4, the information stored in the validity check field 1320 may be, for example, either latest version information of a referenced multimedia document file and data object or timestamp information indicative of a last modification date thereof. These data are characterized in that they are connected with the modification of a corresponding multimedia document and require no further processing. Such data can be applied directly to the validity check field 1320 because they are held in all multimedia documents existing now.

Several examples of information stored in the validity check field 1320 are as follows.

Firstly, a timestamp can be stored in the validity check field 1320. This timestamp is automatically changed in value each time a corresponding multimedia document file and data object are modified in contents. As a result, the timestamp always indicates a last modification time of a corresponding multimedia document file and data object without a necessity for performing additional data processing of the system. For timestamp utilization, when the link 1300 is created, a last modified timestamp of a file and data object of the referenced multimedia document 1500 is stored in the validity check field 1320. Then, for referencing to the file and data object of the multimedia document 1500 via the link 1300, the system reads a timestamp of a multimedia document at a location indicated by location information stored in the location data field 1310 and compares the read timestamp with that stored in the validity check field 1320 of the link 1300. In the case where the two timestamps are different from each other, the file and data object of the currently referenced multimedia document can be recognized to be different from those at the time of link creation. That is, the file and data object of the currently referenced multimedia document can be interpreted to be changed in contents or properties from those when the link 1300 was created, and so the link 1300 can be recognized to be no longer valid from such an interpretation. In this case, the system can reduce an error amount by determining whether to use the link 1300. In the case where the two timestamps are the same, the file and data object of the currently referenced multimedia document 1500 can be recognized to be unchanged after the time of link creation. As a result, the file and data object of the multimedia document can be referenced as they are using the link 1300.

Secondly, version information of the file and data object of the multimedia document 1500 can be stored in the validity check field 1320. The version information generally has such a unique feature that it becomes higher each time a corresponding multimedia document file and data object are modified in contents. As a result, it can be inferred from this feature that different version information signifies different contents of the multimedia document file and data object. For version information utilization, when the link 1300 is created, a latest version of a file and data object of the referenced multimedia document 1500 is stored in the validity check field 1320. Then, for referencing to the file and data object of the multimedia document 1500 via the link 1300, the system reads a version of a multimedia document at a location indicated by location information stored in the location data field 1310 and compares the read version with that stored in the validity check field 1320 of the link 1300. In the case where the two versions are different from each other, the file and data object of the currently referenced multimedia document can be recognized to be different from those at the time of link creation. Namely, the file and data object of the currently referenced multimedia document can be interpreted to be changed in contents or properties from those when the link 1300 was created, and so the link 1300 can be recognized to be no longer valid from such an interpretation. In this case, the system can reduce an error amount by determining whether to use the link 1300. In the case where the two versions are the same, the file and data object of the currently referenced multimedia document 1500 can be recognized to be unchanged after the time of link creation. Accordingly, the file and data object of the multimedia document can be referenced using the link 1300 as they are, thereby increasing the performance and stability of the system using the link.

In the present invention, the link creation can be enabled by any existing methods without being subjected to a particular limitation. Several examples of existing link creation methods are as follows.

Firstly, a link can be created using a hyperlink. This hyperlink is an entity for linking computer system address information of a referenced multimedia document to a specific multimedia document. If a user clicks on a hyperlink portion of the specific multimedia document, then the system shifts from the specific multimedia document to the referenced multimedia document or object, linked to the hyperlink portion. Hence, for hyperlink utilization, the validity check field and validity checking method proposed by the present invention can similarly be applied to determine whether the referenced multimedia document has been changed in contents.

Secondly, in the case of constructing an object index of an information constituent element or object class information in the computer system, a link can be created using an object index number or an object class number among the contents of the constructed object index or object class information.

Alternatively, in the case of constructing an object index of an information constituent element or object class information in the computer system, a link can be created using an object index number or an object class number among the contents of the constructed object index or object class information and an Internet address.

In the present invention, an object may contain all information constituent elements from the lowest order to the highest order according to the type of the computer system as well as a multimedia document. An index number or class number of the object is linked to location information of the object. As a result, the referencing to the object in the computer system can be enabled by searching for the object on the basis of the index number or class number thereof. Hence, for object index number or class number utilization, the validity check field and validity checking method proposed by the present invention can similarly be applied to determine whether a referenced object has been changed in contents after its index or class information is constructed.

Thirdly, a link can be created using constituent information of an information search service provided from an information search system. It is common that information constructed in an information search system has description and location information of a searched multimedia document. Also, each search system has a search information construction period. Therefore, each search system cannot be considered to always provide only latest accurate information to users using the search service between the search information construction periods. Thus, with the validity check field provided along with the latest information, the search service users can discriminate the validity of the provided information, thereby raising the reliability of the search information.

Fourthly, when a specific object of a multimedia document is described, a link can be created using a locator for indicating the location of a different object associated with the specific object. For example, an object representing the figure of an anchor in a moving image containing a news broadcasting scene can reference an object representing the talking figure of a person in a different moving image with the aid of a locator. Also, an object representing the figure of a person in a still image can reference an object representing the figure of a person in a different moving image or still image. Thus, the validity check field and validity checking method proposed by the present invention can similarly be applied for locator utilization. In other words, location information of an object referenced by data of an indicator can be used together with the validity check field to determine whether the referenced object has been changed in content.

Fifthly, a link can be created using a locator for indicating the relation between a syntax element indicative of a syntactic structural characteristic and a semantics element indicative of a semantic structural characteristic, among metadata of multimedia data. Namely, each semantics element has a locator for indicating the location of an associated syntax element, and each syntax element has a locator for indicating the location of an associated semantics element. As a result, the validity check field and validity checking method proposed by the present invention can similarly be applied to a locator for indicating the relation between a syntax element and a semantics element.

Sixthly, a link can be created on the basis of a locator of an object for indicating a time or spatial portion of still image, moving image and audio data, based on a physical or signaling characteristic, and a hierarchical structure of the portion.

In other words, a link can be created on the basis of a locator of an object for indicating a time or spatial portion of moving image data based on a physical or signaling characteristic, such as a shot, scene, key frame, etc. Also, a link can be created on the basis of a locator of an object for indicating a spatial portion of data of a single frame of a still image or moving image based on a physical or signaling characteristic, such as a color, texture, position, shape, orientation, etc.

Further, a link can be created on the basis of a locator of an object for indicating a time or spatial portion of moving image data based on a physical or signaling characteristic, such as a color, texture, motion, etc. Alternatively, a link can be created on the basis of a locator of an object for indicating a spatial portion of still image data expressing a panorama view calculated from a moving image, based on a physical or signaling characteristic, such as a color, texture, warping parameter, etc.

Further, a link can be created on the basis of a locator of an object for indicating a time portion of audio data based on a physical or signaling characteristic, such as a pitch, spectrum, energy parameter, etc.

Seventhly, a link can be created on the basis of a locator of an object for expressing a perceptual concept of still image, moving image, audio and character data, such as a material object or event, for example, a car, man, explosion, etc.

In other words, a link can be created on the basis of a locator of an object for expressing a perceptual concept of still image, moving image, audio and character data, such as an event, for example, an explosion. Alternatively, a link can be created on the basis of a locator of an object for expressing a perceptual concept of still image, moving image, audio and character data, such as a material object, for example, a car or man.

Eighthly, a link can be created using a locator for indicating the location of a different multimedia data object in a computer system based on a distributed processing environment such as a distributed database.

Figure 7:
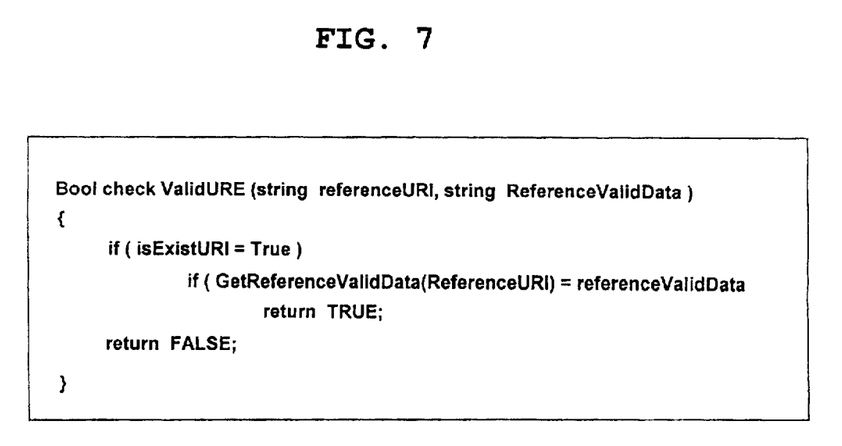
FIG. 7 is a view showing an example of actual coding in the link validity checking method in accordance with the present invention.

FIG. 7 is a view showing an example of actual coding in the link validity checking method in accordance with the present invention.

As apparent from the above description, the present invention provides a field capable of checking a link validity in a computer system, thereby assuring a link consistency. Therefore, the number of system errors can be cost-effectively reduced when referencing a multimedia document, and the reliability of searching and browsing can be increased.

Further, the present invention provides a field capable of storing metadata information regarding an object, which is a basic control unit of a computer system, thereby increasing the system efficiency for object utilization and providing the convenience of application programs to users.

Moreover, for example, in a search service, the validity of a link to searched information can be certainly assured. As a result, the server efficiency can be increased with low cost and it is possible to develop other systems such as a program automatically notifying the update necessitation of the search service or document according to a given function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for creating a link in a computer network, comprising the step of storing last modified timestamp information indicative of a last modification time of each object and/or latest version information of each object in a validity check field for linking to a multimedia document.

2. A method for checking a link validity in a computer network, comprising the steps of:

a) storing last modified timestamp information indicative of a last modification time of each object and/or latest version information of each object in a validity check field upon creating a link;

b) reading location data pre-stored in a location data field and determining whether a multimedia document for referencing is present at a location indicated by the read location data; and c) extracting predetermined information from the multimedia document if it is determined at said step b) that said multimedia document is present at said location, determining whether the extracted information is the same as that pre-stored in said validity check field, performing a referencing process if the extracted information is the same as that pre-stored in said validity check field and performing a referencing error process if the extracted information is not the same as that pre-stored in said validity check field.

3. The method as set forth in claim 2, further comprising the step of:

d) storing a linked Internet address, an object index number, an object class number or an object locator in said location data field.

4. An apparatus for checking a link validity in a computer network, comprising storage means having a validity check field for storing last modified timestamp information indicative of a last modification time of each object and/or latest version information of each object, whereby said apparatus is adapted to check the validity of a link using information pre-stored in said validity check field upon creating the link.

5. The apparatus as set forth in claim 4, wherein said information pre-stored in said validity check field includes last modified timestamp information indicative of a last modification time of each object and/or latest version information of each object.

* * * * *